US006714774B1

United States Patent
Nafie et al.

(10) Patent No.: US 6,714,774 B1
(45) Date of Patent: Mar. 30, 2004

(54) ANTENNA RECEPTION DIVERSITY IN WIRELESS COMMUNICATIONS

(75) Inventors: Mohammed H. Nafie, Richardson, TX (US); Anand G. Dabak, Plano, TX (US); Timothy M. Schmidl, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 423 days.

(21) Appl. No.: 09/634,052

(22) Filed: Aug. 8, 2000

Related U.S. Application Data
(60) Provisional application No. 60/184,634, filed on Feb. 24, 2000.

(51) Int. Cl.[7] .................................................. H04B 1/06
(52) U.S. Cl. .................... 455/273; 455/137; 455/276.1; 375/347; 375/348
(58) Field of Search ......................... 455/65, 504, 506, 455/132, 137, 272, 273, 276.1; 375/347, 349

(56) References Cited

U.S. PATENT DOCUMENTS

| | | | | |
|---|---|---|---|---|
| 5,349,609 A | * | 9/1994 | Tsujimoto | 375/347 |
| 5,425,059 A | * | 6/1995 | Tsujimoto | 375/347 |
| 5,528,581 A | * | 6/1996 | De Bot | 370/203 |
| 5,754,950 A | * | 5/1998 | Petersson et al. | 455/273 |
| 5,930,293 A | * | 7/1999 | Light et al. | 375/211 |
| 6,161,001 A | * | 12/2000 | Iinuma | 455/137 |
| 6,505,053 B1 | * | 1/2003 | Winters et al. | 455/504 |

OTHER PUBLICATIONS

"Networks for Homes", Amitava Dutta–Roy, Contributing Editor, IEEE Spectrum, Communications, 12/99, pp. 26–33.

* cited by examiner

*Primary Examiner*—William Trost
*Assistant Examiner*—Danh C Le
(74) *Attorney, Agent, or Firm*—Ronald O. Neerings; W. James Brady, III; Frederick J. Telecky, Jr.

(57) ABSTRACT

Antenna reception diversity is provided for wireless communications such that a received signal (r) can be produced by combining antenna signals ($v_i$) with their associated fading amplitudes ($\alpha_i$) as estimated by a linear receiver (32). Also, antenna signals ($v1_i$) can be combined with their associated correlation values ($\alpha 1_i$) in place of estimated fading amplitudes. Further, inherent characteristics of a non-linear wireless communication receiver can be exploited such that a received signal (r2, r3) can be produced without any additional overhead that would otherwise be needed to provide estimated fading amplitudes.

22 Claims, 3 Drawing Sheets

ANTENNA RECEPTION DIVERSITY IN WIRELESS COMMUNICATIONS

This application claims the priority under 35 U.S.C. 119(e)(1) of U.S. provisional application No. 60/184,634, filed on Feb. 24, 2000.

FIELD OF THE INVENTION

The invention relates generally to wireless communications and, more particularly, to antenna reception diversity in wireless communications.

BACKGROUND OF THE INVENTION

Present telecommunication system technology includes a wide variety of wireless networking systems associated with both voice and data communications. An overview of several of these wireless networking systems is presented by Amitava Dutta-Roy, *Communications Networks for Homes*, IEEE Spectrum, pg. 26, December 1999. Therein, Dutta-Roy discusses several communication protocols in the 2.4 GHz band, including IEEE 802.11 direct-sequence spread spectrum (DSSS) and frequency-hopping (FHSS) protocols. A disadvantage of these protocols is the high overhead associated with their implementation. A less complex wireless protocol known as Shared Wireless Access Protocol (SWAP) also operates in the 2.4 GHz band. This protocol has been developed by the HomeRF Working Group and is supported by North American communications companies. The SWAP protocol uses frequency-hopping spread spectrum technology to produce a data rate of 1 Mb/sec. Another less complex protocol is named Bluetooth after a $10^{th}$ century Scandinavian king who united several Danish kingdoms. This protocol also operates in the 2.4 GHz band and advantageously offers short-range wireless communication between Bluetooth devices without the need for a central network.

The Bluetooth protocol provides a 1 Mb/sec data rate with low energy consumption for battery powered devices operating in the 2.4 GHz ISM (industrial, scientific, medical) band. The current Bluetooth protocol provides a 10-meter range and a maximum asymmetric data transfer rate of 723 kb/sec. The protocol supports a maximum of three voice channels for synchronous, CVSD-encoded transmission at 64 kb/sec. The Bluetooth protocol treats all radios as peer units except for a unique 48-bit address. At the start of any connection, the initiating unit is a temporary master. This temporary assignment, however, may change after initial communications are established. Each master may have active connections of up to seven slaves. Such a connection between a master and one or more slaves forms a "piconet." Link management allows communication between piconets, thereby forming "scatternets." Typical Bluetooth master devices include cordless phone base stations, local area network (LAN) access points, laptop computers, or bridges to other networks. Bluetooth slave devices may include cordless handsets, cell phones, headsets, personal digital assistants, digital cameras, or computer peripherals such as printers, scanners, fax machines and other devices.

The Bluetooth protocol uses time-division duplex (TDD) to support bi-directional communication. Frequency hopping permits operation in noisy environments and permits multiple piconets to exist in close proximity. The frequency hopping scheme permits up to 1600 hops per second over 79 1-MHZ channels or the entire 2.4 GHz ISM spectrum. Various error correcting schemes permit data packet protection by 1/3 and 2/3 rate forward error correction. Further, Bluetooth uses retransmission of packets for guaranteed reliability. These schemes help correct data errors, but at the expense of throughput.

The Bluetooth protocol is specified in detail in *Specification of the Bluetooth System*, Version 1.0A, Jul. 26, 1999, which is incorporated herein by reference.

Fading is a well known problem in wireless communications systems such as Bluetooth systems. Antenna reception diversity techniques are conventionally used to overcome fading in wireless communications. With antenna reception diversity, a communication signal is received by a plurality of antennas, and the associated antenna signals are then suitably combined to produce the desired communication signal for the receiver. Antenna reception diversity techniques can therefore improve communication quality in the presence of fading.

It is therefore desirable to provide for improved antenna reception diversity in wireless communications systems such as Bluetooth systems.

The present invention provides antenna reception diversity wherein the received signal can be produced by combining the antenna signals with their associated fading amplitudes as estimated by a linear receiver. Also according to the invention, the antenna signals can be combined with their associated correlation values in place of estimated fading amplitudes. Further according to the invention, inherent characteristics of the receiver can be exploited such that the received signal is produced without any additional overhead that would otherwise be needed to provide estimated fading amplitudes.

DETAILED DESCRIPTION

Figure 1:
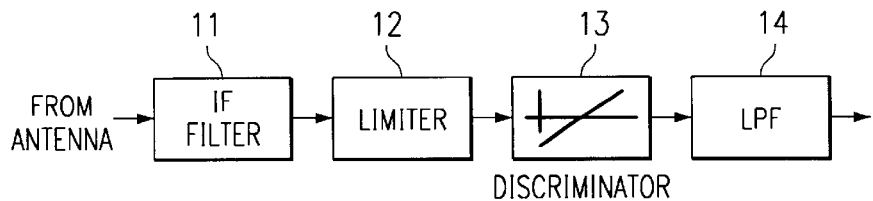
FIGS. 1 and 2 diagrammatically illustrate pertinent portions of a conventional Bluetooth receiver.

FIG. 1 diagrammatically illustrates pertinent portions of a conventional non-linear wireless communication receiver, for example a Bluetooth receiver. As illustrated in FIG. 1, the signal, for example a Bluetooth FSK (frequency shift keying) signal, from a given antenna is input to an intermediate frequency (IF) filter 11, and the resulting filtered signal is input to a limiter 12. The output of the limiter is applied to a discriminator 13, whose output is coupled to a low pass filter (LPF) 14.

Figure 2:
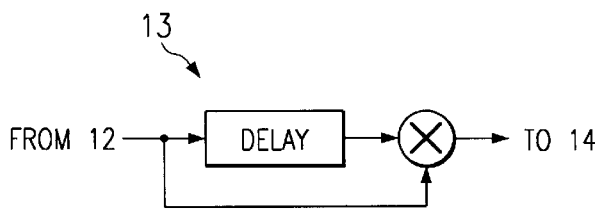

FIG. 2 illustrates the discriminator 13 of FIG. 1 in more detail. In the example of FIG. 2, the discriminator 13 is implemented as a delay and multiply circuit which multiplies the limiter output signal by a delayed version of the limiter output signal (see also FIG. 1).

Optimal antenna selection diversity according to the invention can be achieved by combining the radio frequency (RF) signals (received by a plurality of antennas) after the IF filter 11 and before the limiter 12. According to one exemplary embodiment of the invention, a linear receiver can be inserted after the IF filter 11 as illustrated generally in the exemplary embodiment of FIG. 3. All receiver examples described herein assume the use of N antennas and N corresponding RF front ends.

Figure 3:
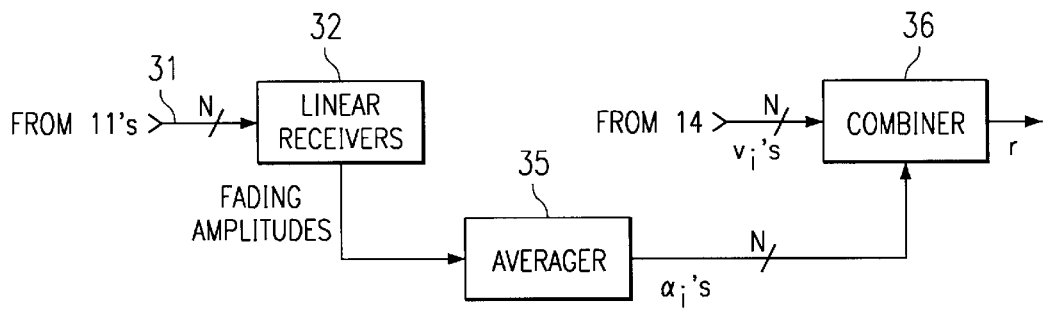
FIG. 3 diagrammatically illustrates pertinent portions of an exemplary embodiment of a wireless communication receiver according to the invention.

The example of FIG. 3 (taken in conjunction with FIG. 1) illustrates at 31 N antenna signals which have been received from N separate antennas and have each passed through an associated IF filter such as shown at 11 in the non-linear receiver of FIG. 1. The signals at 31 are input to a conventional N-channel linear receiver (or N linear receivers) 32. The linear receiver 32 can use conventional techniques to estimate fading amplitudes associated with each of the N antennas. For each of the N antenna signals at 31, the linear receiver can use conventional techniques to estimate fading amplitudes from training symbols, for example the symbols of the Bluetooth synchronization word. The fading amplitudes for each antenna signal are output from the linear receiver 32 to an averager 35 which can average the estimated fading amplitudes associated with each of the antenna signals, and thereby can output N average estimated fading amplitudes. These average estimated fading amplitudes are designated as $\alpha_i$ in FIG. 3. These average estimated fading amplitudes are input to a combiner 36 along with N corresponding antenna signals $v_i$ produced by N associated non-linear receivers such as the one shown in FIG. 1. The combiner 36 combines $\alpha_i$ and $v_i$ as follows $$r = \sum_{i=1}^{N} |\alpha_i|^2 v_i \qquad \text{Equation 1}$$

in order to produce the received signal r. The signals $v_i$ are thus ratiometrically combined with respect to the squares of the signals $\alpha_i$. In some embodiments, $|\alpha_i|^2$ is replaced in Equation 1 by $|\alpha_i|$.

Figure 4:
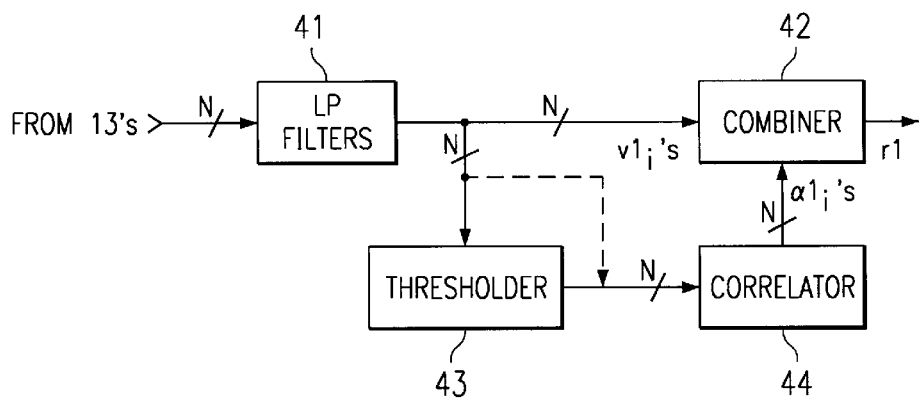
FIG. 4 diagrammatically illustrates pertinent portions of a further exemplary embodiment of a wireless communication receiver according to the invention.

FIG. 4 diagrammatically illustrates pertinent portions of another embodiment of a wireless communication receiver according to the invention. In the receiver of FIG. 4, N antenna signals which have each passed through an associated IF filter 11, limiter 12 and discriminator 13 as illustrated in FIG. 1, are input to a bank of N low pass filters 41. The signals output from the filters 41 can be input to a conventional thresholder 43, and are also input to a combiner 42. These signals are designated as $v1_i$ in FIG. 4. The thresholder 43 can be omitted in some embodiments, as shown by broken line. The signals output from the thresholder 43 are applied to a conventional correlator 44 which can use conventional techniques to correlate with any known part of the received signals. In a Bluetooth example, the correlator 44 can correlate with the Bluetooth synchronization word. As another example, the correlator can correlate with a larger part of the received signal, for example a packet header, in situations when the header is fixed (i.e., known). The maximum value of the correlation for each antenna signal is output from the correlator 44 to the combiner 42. These maximum values, designated as $\alpha 1_i$ in FIG. 4, can be used as an estimate of the fading amplitude. The combiner 42 combines the signals $v1_i$ and $\alpha 1_i$ as follows $$r1 = \sum_{i=1}^{N} |\alpha I_i|^2 v1_i \qquad \text{Equation 2}$$

to produce the received signal r1. The signals $v1_i$ are thus ratiometrically combined with respect to the squares of the signals $\alpha 1_i$. In some embodiments, $|\alpha_i 1|^2$ is replaced in Equation 2 by $|\alpha_i 1|$.

Figure 5:
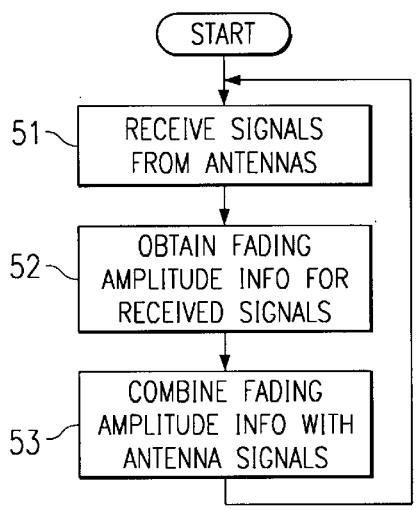
FIG. 5 illustrates exemplary operations which can be performed by the receivers of FIGS. 3 and 4.

FIG. 5 illustrates exemplary operations which can be performed by the receivers of FIGS. 3 and 4. The signals from the antennas are received at 51, and the corresponding fading amplitude information is obtained at 52. Thereafter at 53, the fading amplitude information is combined with the antenna signals (e.g., using Equation 1 or 2) to produce the received signal.

Figure 6:
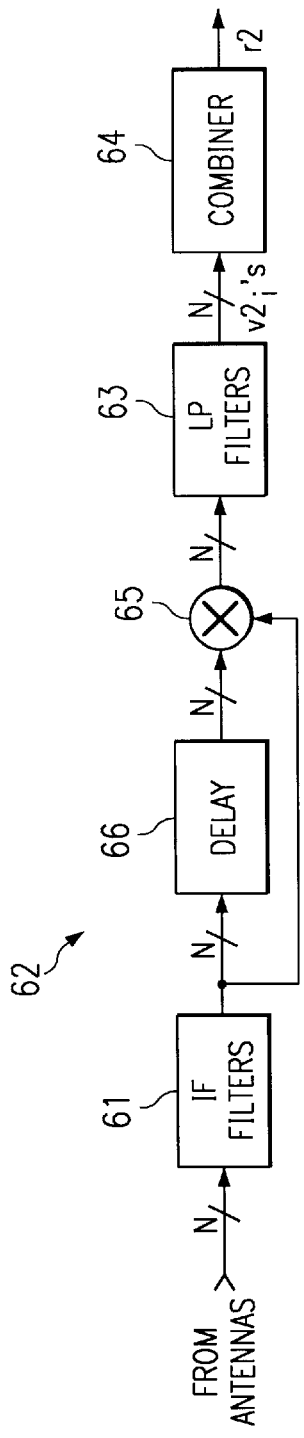
FIG. 6 diagrammatically illustrates pertinent portions of a further exemplary embodiment of a wireless communication receiver according to the invention.

The present invention recognizes that, if the limiter 12 is removed from the conventional receiver of FIG. 1, it can be shown analytically that the output of the delay and multiply discriminator 13 (see also FIG. 2) has already been multiplied by the square of the fading amplitude associated with that antenna. The exemplary receiver of FIG. 6 exploits this characteristic by coupling the output of the IF filter bank 61 directly to a bank of delay and multiply discriminators (or an N-channel discriminator) at 62. The discriminator outputs are applied to an LP filter bank 63, and the resulting LP-filtered signals, designated as $v2_i$ in FIG. 6, are applied to a combiner 64. The combiner combines the $v2_i$ signals as follows $$r2 = \sum_{i=1}^{N} v2_i \qquad \text{Equation 3}$$

to produce the received signal r2. Because the discriminator outputs in FIG. 6 are already multiplied by the square of the corresponding fading amplitude, there is no need to estimate the fading amplitudes in the embodiment of FIG. 6. However, the multipliers (or N-channel multiplier) at 65 of FIG. 6 need to be real number multipliers, which can be relatively complex to implement.

Figure 7:
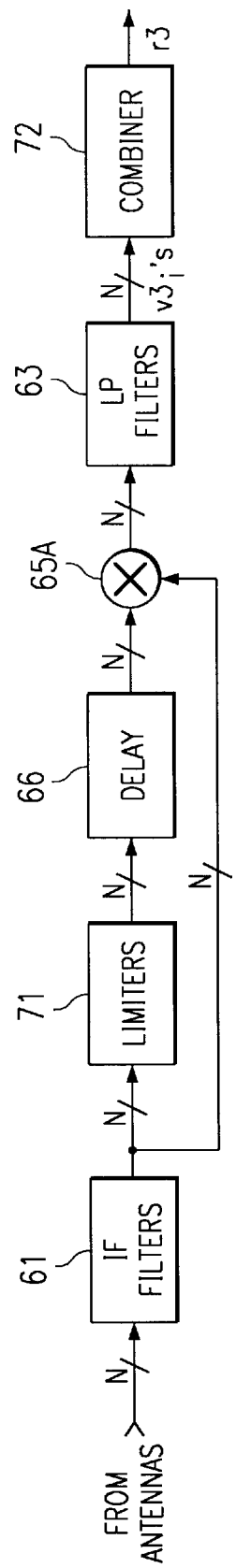
FIG. 7 diagrammatically illustrates pertinent portions of a further exemplary embodiment of a wireless communication receiver according to the invention.

FIG. 7 diagrammatically illustrates pertinent portions of an exemplary embodiment of a wireless communication receiver (e.g., a Bluetooth receiver) which exploits the aforementioned fading amplitude multiplication property of a delay and multiply discriminator, and which also avoids the necessity of implementing a real number multiplier. The embodiment of FIG. 7 is generally similar to the embodiment of FIG. 6, except that limiters (or an N-channel limiter) 71 are inserted into the delay and multiply discriminators between the IF filters 61 and the delay elements (or N-channel delay element) 66. With this arrangement, the multiplier 65A is just a real number adder, which is easily implemented, for example, using charge/discharge capacitors. A combiner 72 combines the outputs $v3_i$ of the LP filters 63 as follows $$r3 = \sum_{i=1}^{N} v3_i \qquad \text{Equation 4}$$

to produce the received signal r3.

Figure 8:
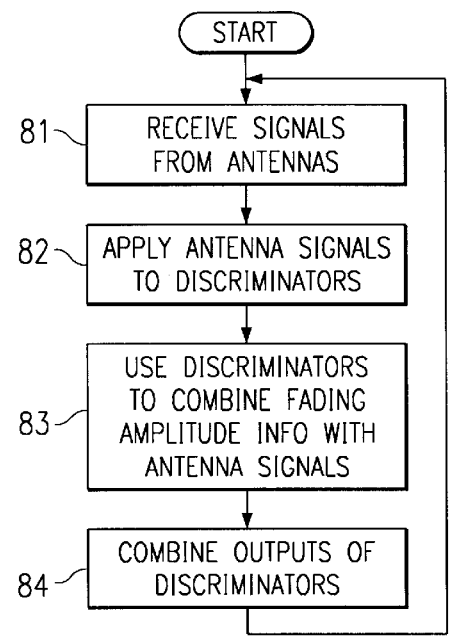
FIG. 8 illustrates exemplary operations which can be performed by the receivers of FIGS. 6 and 7.

FIG. 8 illustrates exemplary operations which can be performed by the receivers of FIGS. 6 and 7. The antenna signals are received at 81, and are applied to delay and multiply discriminators at 82. At 83, the fading amplitude multiplication characteristic of the discriminators is exploited to combine the antenna signals with the corresponding fading amplitude information. Thereafter at 84, the discriminator outputs are combined, for example, according to Equation 4.

Figure 9:
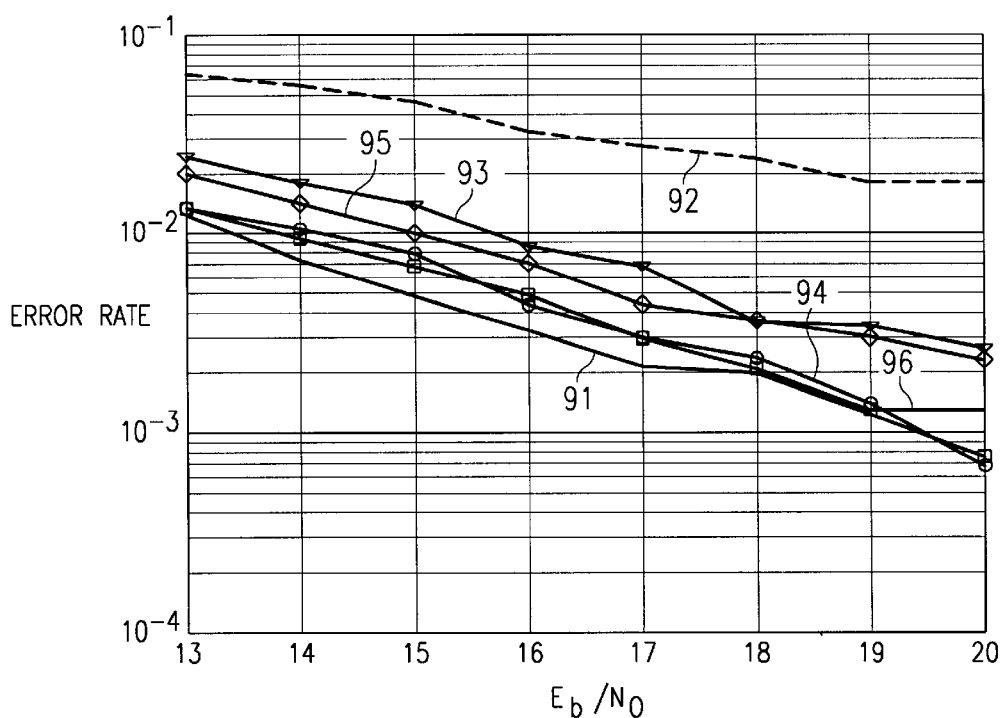
FIG. 9 illustrates simulation results obtained according to the invention.

FIG. 9 illustrates exemplary simulation results associated with the receivers of FIGS. 3, 4 and 7 with N=2 antennas. In FIG. 9, the curve 91 is optimum reception diversity with N=2 antennas, the curve 92 is obtained using one antenna, and the curve 93 is obtained using two selectively switched antennas which share a common RF front end. The curve 94 corresponds to the receiver of FIG. 3, the curve 95 corresponds to the receiver of FIG. 4 and the curve 96 corresponds to the receiver of FIG. 7.

It will be evident to workers in the art that the embodiments described above with respect to FIGS. 2–8 can be implemented, for example, by suitable modifications in software, hardware, or a combination of software and hardware, in conventional radio receivers that use antenna reception diversity, for example Bluetooth receivers.

What is claimed is:

1. A method of producing a received signal from a plurality of antenna signals respectively produced from a plurality of antennas by a non-linear receiver, comprising:
   using a linear receiver to estimate fading amplitudes associated with the respective antenna signals; and
   combining the estimated fading amplitudes with the associated antenna signals to produce the received signal.

2. The method of claim 1, wherein said combining step includes combining the antenna signals ratiometrically with respect to the associated fading amplitude estimates.

3. The method of claim 2, wherein said combining step includes multiplying squares of the estimated fading amplitudes by the associated antenna signals to produce a plurality of combined signals, and summing the combined signals to produce the received signal.

4. The method of claim 2, wherein said combining step includes multiplying the estimated fading amplitudes by the associated antenna signals to produce a plurality of combined signals, and summing the combined signals to produce the received signal.

5. A method of producing a received signal from a plurality of antenna signals respectively produced from a plurality of antennas by a non-linear receiver, comprising:
   using a correlator to estimate fading amplitudes associated with the respective antenna signals; and
   combining the estimated fading amplitudes with the associated antenna signals to produce the received signal wherein said combining step includes combining the antenna signals ratiometrically with respect to the associated fading amplitude estimates and includes multiplying squares of the estimated fading amplitudes by the associated antenna signals to produce a plurality of combined signals, and summing the combined signals to produce the received signal.

6. A method of producing a received signal from a plurality of antenna signals respectively produced from a plurality of antennas by a non-linear receiver, comprising:
   using a correlator to estimate fading amplitudes associated with the respective antenna signals; and
   combining the estimated fading amplitudes with the associated antenna signals to produce the received signal wherein said combining step includes combining the antenna signals ratiometrically with respect to the associated fading amplitude estimates and includes multiplying the estimated fading amplitudes by the associated antenna signals to produce a plurality of combined signals, and summing the combined signals to produce the received signal.

7. A method of producing a received signal from a plurality of antenna signals respectively produced from a plurality of antennas by a non-linear receiver, comprising:
   using a correlator to estimate fading amplitudes associated with the respective antenna signals wherein said using step includes determining correlation values for the respective antenna signals and providing the correlation values as the estimated fading amplitudes; and
   combining the estimated fading amplitudes with the associated antenna signals to produce the received signal.

8. A method of producing a received signal from a plurality of antenna signals respectively associated with a plurality of antennas, comprising:
   multiplying the antenna signals by respectively delayed versions of the antenna signals to thereby produce further signals that represent the antenna signals combined with their associated fading amplitudes wherein the further signals represent squares of the fading amplitudes multiplied by the associated antenna signals; and
   combining the further signals to produce the received signal.

9. The method of claim 8, including passing each of the antenna signals through a limiter and a delay element to produce the delayed versions of the antenna signals.

10. The method of claim 8, wherein said combining step includes summing the further signals to produce the received signal.

11. An apparatus for producing a received signal from a plurality of antenna signals respectively produced from a plurality of antennas by a non-linear receiver, comprising:
    a combiner having a first input for receiving the antenna signals and a second input for receiving estimated fading amplitudes associated with the respective antenna signals, said combiner operable for combining the estimated fading amplitudes with the associated antenna signals to produce the received signal; and
    a linear receiver having an input for coupling to the antennas, said linear receiver operable in response to signals received from the antennas for producing at an output thereof information indicative of the estimated fading amplitudes, said linear receiver output coupled to said second input of said combiner.

12. The apparatus of claim 11, wherein said combiner is operable for combining the antenna signals ratiometrically with respect to the associated fading amplitude estimates.

13. The apparatus of claim 12, wherein said combiner is operable for multiplying squares of the estimated fading amplitudes by the associated antenna signals to produce a plurality of combined signals, and is further operable for summing the combined signals to produce the received signal.

14. The apparatus of claim 12, wherein said combiner is operable for multiplying the estimated fading amplitudes by the associated antenna signals to produce a plurality of combined signals, and is further operable for summing the combined signals to produce the received signal.

15. The apparatus of claim 11, including an averager coupled between said linear receiver output and said second input of said combiner for averaging said information provided at said output to produce the estimated fading amplitudes.

16. An apparatus for producing a received signal from a plurality of antenna signals respectively produced from a plurality of antennas by a non-linear receiver; comprising:

a combiner having a first input for receiving the antenna signals and a second input for receiving estimated fading amplitudes associated with the respective antenna signals, said combiner operable for combining the estimated fading amplitudes with the associated antenna signals to produce the received signal;

a correlator having a third input coupled to said first input and responsive thereto for producing correlation values associated with the respective antenna signals, said correlator having an output coupled to said second input of said combiner for providing the correlation values to said combiner as the estimated fading amplitudes; and a thresholder coupled between said first input and said third input.

17. An apparatus for producing a received signal from a plurality of antenna signals respectively produced from a plurality of antennas by a non-linear receiver; comprising:

a combiner having a first input for receiving the antenna signals and a second input for receiving estimated fading amplitudes associated with the respective antenna signals, said combiner operable for combining the estimated fading amplitudes with the associated antenna signals to produce the received signal wherein said combiner is operable for combining the antenna signals ratiometrically with respect to the associated fading amplitude estimates and further operable for multiplying squares of the estimated fading amplitudes by the associated antenna signals to produce a plurality of combined signals, and for summing the combined signals to produce the received signal; and a correlator having a third input coupled to said first input and responsive thereto for producing correlation values associated with the respective antenna signals, said correlator having an output coupled to said second input of said combiner for providing the correlation values to said combiner as the estimated fading amplitudes.

18. An apparatus for producing a received signal from a plurality of antenna signals respectively produced from a plurality of antennas by a non-linear receiver; comprising:

a combiner having a first input for receiving the antenna signals and a second input for receiving estimated fading amplitudes associated with the respective antenna signals, said combiner operable for combining the estimated fading amplitudes with the associated antenna signals to produce the received signal wherein said combiner is operable for combining the antenna signals ratiometrically with respect to the associated fading amplitude estimates and further operable for multiplying the estimated fading amplitudes by the associated antenna signals to produce a plurality of combined signals, and for summing the combined signals to produce the received signal; and a correlator having a third input coupled to said first input and responsive thereto for producing correlation values associated with the respective antenna signals said correlator having an output coupled to said second input of said combiner for providing the correlation values to said combiner as the estimated fading amplitudes.

19. An apparatus for producing a received signal from a plurality of antenna signals respectively associated with a plurality of antennas, comprising:

a discriminator having a first input for receiving the antenna signals, said discriminator operable for multiplying the antenna signals by respectively delayed versions of the antenna signals to thereby produce further signals that represent the antenna signals combined with their associated fading amplitudes wherein the further signals represent squares of the fading amplitudes multiplied by the associated antenna signals; and a combiner coupled to said discriminator for combining the further signals to produce the received signal.

20. The apparatus of claim 19, wherein said discriminator includes a multiplier having a second input coupled to said first input, said multiplier including a third input, and said discriminator further including a delay element coupled between said first input and said third input.

21. The apparatus of claim 20, wherein said discriminator further includes a limiter coupled between said first input and said delay element.

22. The apparatus of claim 19, wherein said combiner is operable for summing the further signals to produce the received signal.

* * * * *